US006970450B1

(12) United States Patent
Scott (10) Patent No.: US 6,970,450 B1
(45) Date of Patent: Nov. 29, 2005

(54) SYSTEM, METHOD AND COMPUTER PROGRAM PRODUCT FOR POINT-TO-POINT BANDWIDTH CONSERVATION IN AN IP NETWORK

(75) Inventor: Mark Scott, Ashburn, VA (US)

(73) Assignee: Array Telecom Corporation, Herndon, VA (US)

( * ) Notice: Subject to any disclaimer, the term of this patent is extended or adjusted under 35 U.S.C. 154(b) by 0 days.

(21) Appl. No.: 09/430,297

(22) Filed: Oct. 29, 1999

(51) Int. Cl.$^7$ .................................................. H04L 12/66

(52) U.S. Cl. ..................................... 370/352; 370/471

(58) Field of Search ................................ 370/352, 473, 370/474, 466, 394, 216, 356, 392, 471; 358/1.15; 709/214, 247, 201; 714/1, 6

(56) References Cited

U.S. PATENT DOCUMENTS

| 4,970,714 | A | * | 11/1990 | Chen et al. ................. 370/17 |
| 6,032,197 | A | * | 2/2000 | Birdwell et al. ............ 709/247 |
| 6,389,038 | B1 | * | 5/2002 | Goldberg et al. ........... 370/471 |
| 6,434,606 | B1 | * | 8/2002 | Borella et al. .............. 709/214 |
| 6,438,105 | B1 | * | 8/2002 | Quarni et al. .............. 370/231 |
| 6,442,169 | B1 | * | 8/2002 | Lewis ......................... 370/401 |
| 6,483,600 | B1 | * | 11/2002 | Schuster et al. ........... 358/1.15 |
| 6,535,925 | B1 | * | 3/2003 | Svanbro et al. ............ 709/247 |
| 6,542,504 | B1 | * | 4/2003 | Mahler et al. .............. 370/392 |
| 6,574,218 | B1 | * | 6/2003 | Cooklev ..................... 370/352 |

FOREIGN PATENT DOCUMENTS

WO   WO 97/27692   7/1997

OTHER PUBLICATIONS

Hoshi T., et al. "Voice Stream Multiplexing between IP Telephony Gateways," IEICE Transactions on Information and Systems,vol. E82-D, No. 4, Apr. 1999, pp. 838-845.
Subbiah B., et al., "User Multiplexing in RTP payload between IP Telephony Gateways," Internet Engineering Task Force, Aug. 21, 1998, pp. 1-17.
Copy of Partial International Search, issued Jun. 14, 2001, Application No. PCT/US00/41679, 1 page.

* cited by examiner

Primary Examiner—Phirin Sam
Assistant Examiner—Robert W. Wilson
(74) Attorney, Agent, or Firm—Sterne, Kessler, Goldstein & Fox P.L.L.C.

(57) ABSTRACT

A method, system and computer program product are provided that reduce voice and data over IP (VoIP) packet overhead in an Internet telephony system, and regenerate missing or damaged data in a data packet. A media framer aggregates packets from multiple concurrent calls from several channels into a larger data packet. A transmission control module defines the format for each data packet, and updates and synchronizes header information in the data packets. A single virtual connection transmits data packets and other signals between originating and destination gateways located in the service areas for a caller and called party. System redundancy improves the quality of service by regenerating missing or damaged data in the data packets.

22 Claims, 7 Drawing Sheets

SYSTEM, METHOD AND COMPUTER PROGRAM PRODUCT FOR POINT-TO-POINT BANDWIDTH CONSERVATION IN AN IP NETWORK

BACKGROUND OF THE INVENTION

1. Field of the Invention

The present invention relates generally to telecommunications systems and internetworking. More specifically, the present invention pertains to performing real-time multimedia communications over data networks.

2. Related Art

The global Internet has quickly become a cost-effective and reliable medium for long distance communications. As well known to those skilled in the relevant art(s), the global Internet is simply a vast interconnection of various computer networks. This multitude of computer networks varies in size and type such as, local internets, corporate intranets, local area networks (LAN), wide area networks (WAN), private enterprise networks, etc.

The evolution of Internet technologies has made it possible for government officials, educational institutions, businesses, nonprofit organizations and individuals to access and use the local networks or personal computers of other persons or organizations. Internet users have been able to established Web sites or home pages to promote commercial or personal activities. For example, one may browse various Web sites to seek information, purchase products or services, or complete customer surveys.

Since the Internet has historically represented a low-cost alternative to long distance communications, technological advancements have paved the way for multimedia transmissions over the Internet. The Internet has been used to transmit data, voice, video and graphics. As a result, the Internet has evolved to support electronic mailing services (Email), video-conferencing, voice telephony and facsimile. Traditionally speaking, multimedia would have been transmitted at regular rates over Public Switched Telephone Networks (PSTN) (also called Plain Old Telephone System (POTS)). The Internet, at present, provides an opportunity to transmit multimedia at a significantly lower price—the price of maintaining an account with an Internet Service Provider (ISP) which currently ranges between $9.99 to $21.99 per month.

Unfortunately, the voice communications over the Internet are not as reliable as voice communications over a PSTN. The standard Internet Protocol (IP) developed to govern communications over public and private Internet backbones does not provide any quality of service (QoS) guarantees. The protocol is defined in Internet Standard (STD) 5, Request for Comments (RFC) 791 (Internet Architecture Board). IP communications continue to suffer from problems related to delay, packet loss, jitter and bandwidth availability. Low QoS can be tolerated with Email, facsimile messages and data downloads from remote Web sites since communication can be retried several times until the information has correctly been transferred. However, with real-time voice communications, such as telephone conversations, QoS becomes a significant issue. In other words, delays, loss and jitter can significantly impact a user's ability to receive and comprehend voice or video communications.

For example, applications depending on IP networks cannot generally reserve the necessary bandwidth for communication using a widely deployed means. Depending on various factors, such as time of day and locality of the originating or destination call, the network conditions are often not sufficient to sustain the quality of the voice communication. Therefore, one major concern involves the ability to reserve the amount of bandwidth required for each call and to have bounds on other factors affecting quality, such as delay and packet loss. Additionally, current protocols for Internet telephony lose a significant amount of efficiency due to packet overhead caused by the addition of headers. The typical size of data within a frame approximates only twenty bytes. The headers typically include a local network address (e.g., Ethernet, Token Ring, Asynchronous Transfer Mode (ATM), etc.) header, IP address header, and IP transport header, such as Transmission Control Protocol (TCP) or User Datagram Protocol (UDP), and Real-Time Transport Protocol (RTP) header. The header size collectively averages anywhere from thirty to sixty bytes. As shown in Table I, the header size can represent as much as 75% of the required bandwidth, or rather 300% of the payload or data frame. To transmit one data frame, the IP network would require a bandwidth index of 4.0. In other words, the required bandwidth is four times the size of the data frame. To reduce the needed bandwidth, as seen in Table I, a gateway or router can aggregate the voice frames to reduce the overhead. For instance, using a buffer to aggregate three voice frames and transmit the aggregated frames in a single data packet, the gateway would reduce the overhead from 75% to 50%.

TABLE I

| #Data Frames per Packet | Latency | % Overhead | Bandwidth Index |
| --- | --- | --- | --- |
| 1 | 30 ms | 75% | 4.0 |
| 2 | 60 ms | 60% | 2.5 |
| 3 | 90 ms | 50% | 2.0 |

Buffering the frames, however, typically leads to a second major concern—call latency. When the IP network transmits data, such as Email or facsimile messages, the receiver can tolerate delays in receiving the data packets without sacrificing QoS. However, during real-time telephone conversations, delays in receiving data packets can significantly impair the parties' ability to speak and hear each other clearly. Therefore, using the buffer to aggregate the data frames increases the latency proportionally to the number of frames. Because the originating gateway must wait until the number of frames required for transmission have been aggregated, each additional frame adds latency equal to the length of the frame being buffered.

A third major concern is that data packets can be lost during the transmission, thereby leaving gaps in the conversation. Generally speaking, IP and UDP environments provide unreliable networks. Data packets can be lost or delayed for a variety of reasons, such as bandwidth congestion, unavailable routes, defective Internet engines, etc. If the data packet is lost, the only way to retrieve it is for the destination gateway to send a message to the originating gateway to ask it to retransmit the data packet. This, of course, would add additional delays to receiving the message, thus degrading the quality of the voice communication and providing an unsuitable medium for real-time communication.

Consequently, an IP communications system, method and computer program product are needed to solve the above-identified problems and provide an efficient and cost-effective way to provide real-time bidirectional communication of multimedia, mitigate call latency, conserve bandwidth requirements and reduce packet loss.

SUMMARY OF THE INVENTION

The present invention overcomes the above identified problems with conventional Internet telephony systems by implementing a method to reduce voice and data over Internet Protocol (VoIP) packet overhead and provide tolerance against packet loss. An advantage of the present invention is a reduction in bandwidth requirements, call latency and data loss.

In one embodiment, a media framer aggregates packets from multiple concurrent calls from several channels into a larger data packet. A transmission control module coordinates the local aggregation process with the remote separation process to ensure consistency while achieving maximal efficiency. The transmission control module allows originating and destination gateways to exchange the necessary control information to interpret the header information in each media frame. A single virtual connection is used to transmit the data packets and other signals between originating and destination gateways located in the service areas for a calling and called party.

In another embodiment of the present invention, a redundancy method is implemented to regenerate missing or damaged data in the data packets. A check sequence data packet is periodically transmitted to allow correction if any one of the immediately previously routed data packets have any missing or damaged frames. If any missing or damaged frames are discovered, the frames are regenerated with information contained inside of the check sequence data packet.

Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

I. Overview

The present invention relates to a system, method and computer program product for transmitting voice and data over the global Internet and private IP-based intranets, in a manner that conserves bandwidth, mitigates call latency and reduces data loss. In particular, one embodiment of the present invention alleviates the above-mentioned problems by using a voice and data over Internet Protocol (VoIP) packet overhead reduction method to establish a single virtual connection via a User Datagram Protocol over Internet Protocol (UDP/IP) connectionless protocol between any two nodes on a network. The computer-implemented method aggregates data from multiple concurrent calls into a larger data packet that is sent over the virtual connection. The software module of the present invention allows VoIP communication between VoIP devices using a new protocol that has a significantly lower overhead.

In another embodiment, a redundancy method regenerates missing data to prevent degradation of the communication link caused by lost data packets. A check sequence data packet is routed after the transmission of every three data packets. The check sequence data packet is used to determine the presence of missing or damage data and replace the same. This method requires additional bandwidth for the check sequence data packet; however, this bandwidth would typically be available in a given environment due to the overhead reduction method. Thus, taken as a whole, the invention allows a configurable tradeoff between lower latency, reduced bandwidth and packet loss tolerance.

II. System Architecture

Figure 1:
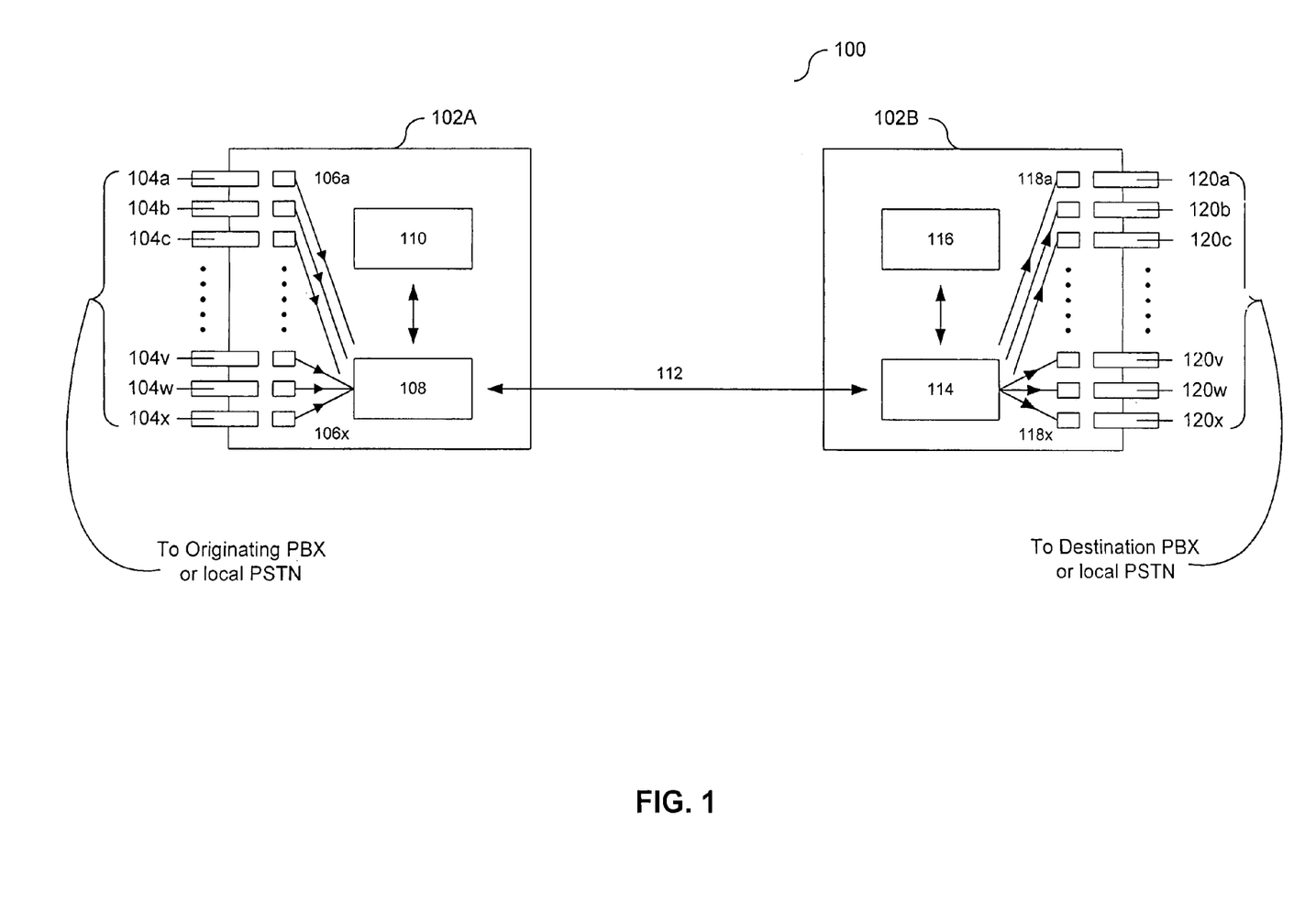
FIG. 1 is a block diagram illustrating the system architecture according to an embodiment of the present invention, showing connectivity among the various components.

Referring to FIG. 1, a block diagram illustrates the system architecture of an embodiment of the present invention and depicts the connectivity among various components. More specifically, FIG. 1 illustrates an Internet telephony system 100 ("IP system 100" or "system 100"), according to one embodiment of the present invention.

IP system 100 includes an originating gateway 102A and a destination gateway 102B that are connected to each other over an IP network such as the global Internet. These components of system 100, explained in more detail below, are integral to routing voice and data over IP networks. For instance, the originating gateway 102A is configured to receive voice and data streams representing a phone call from a local Public Switched Telephone Network (PSTN) or Private Branch Exchange (PBX). After the originating gateway 102A routes the call to the destination gateway 102B located in the service area of a called party, voice and data steams are transmitted to the local PSTN or PBX in the called party's vicinity.

In an embodiment of the present invention, the gateways are configured to support the International Telecommunications Union—Telecommunications (ITU-T) H.323 communications standard. H.323 defines the standard for terminals, equipment and services used in multimedia communication over local area networks (LANs) and IP networks. The gateways interface wit H.323 terminals or PSTN users accessing via a supported PSTN interface. In addition, the gateways can be capable of communication using other protocols as well.

In an embodiment of the present invention, the gateways contain interface cards (not shown) enabling communication with the local PSTN or PBX. The interface cards can be personal computer (PC) compatible. The interface cards permit the gateways to transmit and receive analog signals from the PBX or digital signals from the PSTN. The interface cards include a digital signal processor (not shown) that converts the analog signals to digital forms upon receipt, or converts digital signals to an analog format when transmitting to the destination PBX. The PBX and PSTN can receive or transmit calls directly to a user (i.e., the caller or called party) or indirectly from other networks such as, private enterprise networks, wireless networks, intranets, local internets, business video networks, cellular or satellite-based networks. The user can be an individual person (in a home or business) or Internet Service Provider (ISP), Inter-Exchange Carrier (IXC), Local Exchange Carrier (LEC) or cable service provider bundling voice services with its traditional services.

As shown in FIG. 1, the gateways 102A and 102B, in one embodiment of the present invention, contain ports ("104a–104x" and "120a–120x") that correspond to channels on an Integrated Services Digital Network (ISDN) line. The channels are independent of each other and support both voice and data. The originating 102A and destination 102B gateways include software modules ("106a–106x" and "118a–118x," respectively) that compress and packetize the voice or data into datagrams (data packets or protocol data units).

FIG. 1 also shows that each of the gateways 102A and 102B contain two call management software modules, namely a media framer module 108 and 114, and a transmission control module 110 and 116, respectively. In one embodiment, the gateways can use a Resource Reservation Protocol (RSVP) to allocate and reserve bandwidth.

III. General System Operation

Figure 5:
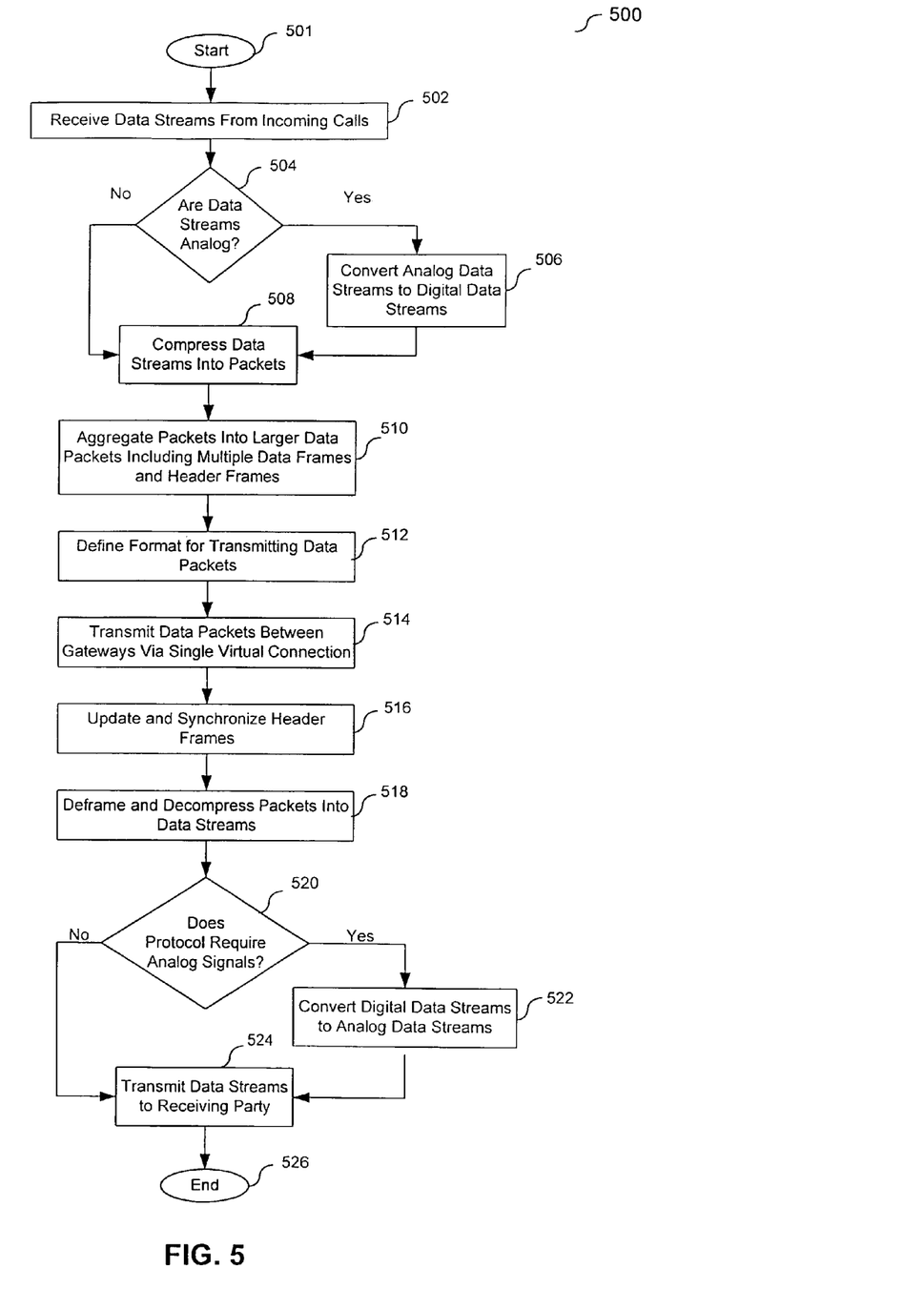
FIG. 5 is a flow chart representing the general operational flow according to an embodiment of the present invention.
Figure 6:
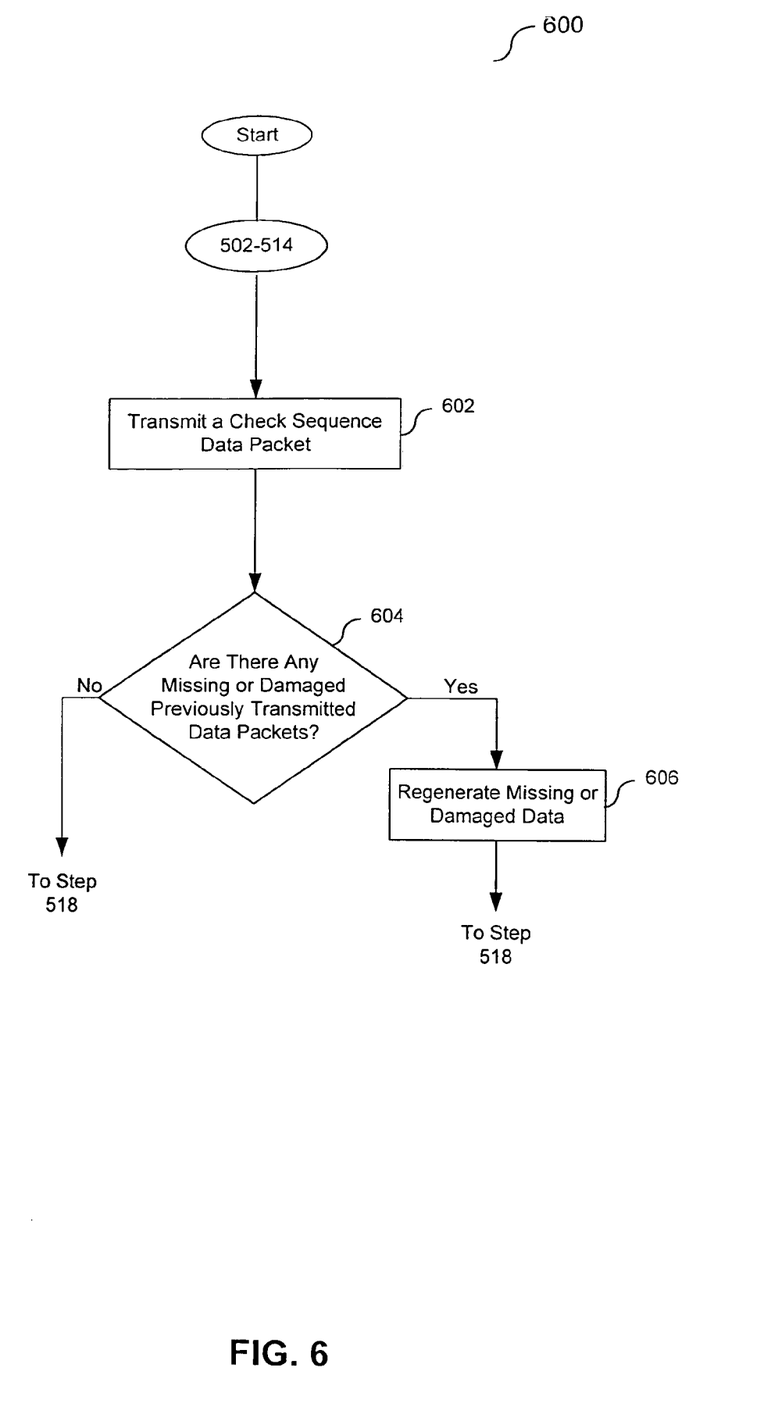
FIG. 6 is a flow chart representing the general operational flow of a redundancy routine implemented according to an embodiment of the present invention.

Referring to FIG. 5 and FIG. 6, flowcharts 500 and 600, respectively, represent the general operational flow of two embodiments of the present invention. More specifically, flowchart 500 shows an example of a control flow for conserving bandwidth while routing a call over the Internet. Flowchart 600 shows a second example of the control flow for reducing data loss while routing the call.

FIG. 5 begins at step 501 and pass immediately to step 502. In step 502, originating gateway 102A receives voice or data streams (hereinafter "data streams") from the incoming call. At step 504, gateway 102A contains an interface card that determines whether the data streams are analog or digital signals. If the data streams are analog, the data streams are first converted to digital signals at step 506. Otherwise, the digital data streams are compressed into packets at step 508.

At step 510, media framer 108 aggregates the packets that it receives from multiple channels into a larger data packet. The larger data packet contains two parts. First, the data packet includes header frames that indicate the source, destination, length and other characteristics of the individual packets. The data packet also include payload frames or data frames that contain the data that is being transported.

At step 512, transmission control module 110 defines the format for routing the data packet. This information is included in the header frames. The data packet is routed over the Internet at step 514 through a single virtual connection 112. In one embodiment of the present invention, system 100 uses a UDP/IP connectionless protocol to route the data packet. At step 516, the transmission control module 110 updates and synchronizes the header frames during the routing process. In other words, transmission control module 110 synchronizes its version table with data from destination gateway 102B. In one embodiment of the present invention, as shown in FIG. 1, all signals from the transmission control module 110 are transmitted via the media framer 108. However, the virtual connection 112 between gateways 102A and 102B can be configured to support direct communications between the respective transmission control modules 110 and 116. Therefore, the present invention can be configured so that transmission control module 110 does not have to transmit its signals through the media framer 108.

At step 518, destination gateway 102B deframes and decompresses the data packet upon receipt. At step 520, destination gateway 102B determines whether the data streams will be routed over a PBX or a local PSTN via an analog or digital interface. If the interface is analog, the data streams are converted to analog signals at step 522. Otherwise, the data streams are transmitted to the receiving party at step 524. The control flow of flowchart 500 then ends as indicated by step 526.

In an alternative embodiment of the present invention, system 100 also implements a data redundancy method to reduce data loss. Referring to FIG. 6, the control flow of flowchart 600 begins at step 501 and continues to step 514 as discussed above with reference to FIG. 5. After the data packet is transmitted to destination gateway 102B at step 514, gateway 102A transmits a check sequence data packet at step 602. In one embodiment of the present invention, the check sequence data packet is routed after three data packets have been transmitted. At step 604, the check sequence data packet is used to determine if any of the three previously transmitted data packets contain any missing or damaged frames. If any missing or damaged frames are present, the missing or damaged frames are regenerated at step 606. Afterwards, the control flow continues to step 518 as discussed above. Alternatively, if no missing or damage data is discovered, the control flow continues directly to step 518.

IV. General System Characteristics

Given the above description, the following features and advantages (i.e., characteristics) of the present invention are further highlighted.

A. Bandwidth Conservation

One important aspect of IP telephony system 100 is the ability to significantly reduce the amount of overhead in an IP datagram (data packet or protocol data unit (PDU)). This can be accomplished by aggregating a certain amount of data frames from a plurality of channels before the data packet is transmitted. Because the overhead per packet is fixed, the overhead per channel can be reduced since there are a greater number of channels per packet. The present invention uses a software module that implements a VoIP packet overhead reduction method.

Figure 2:
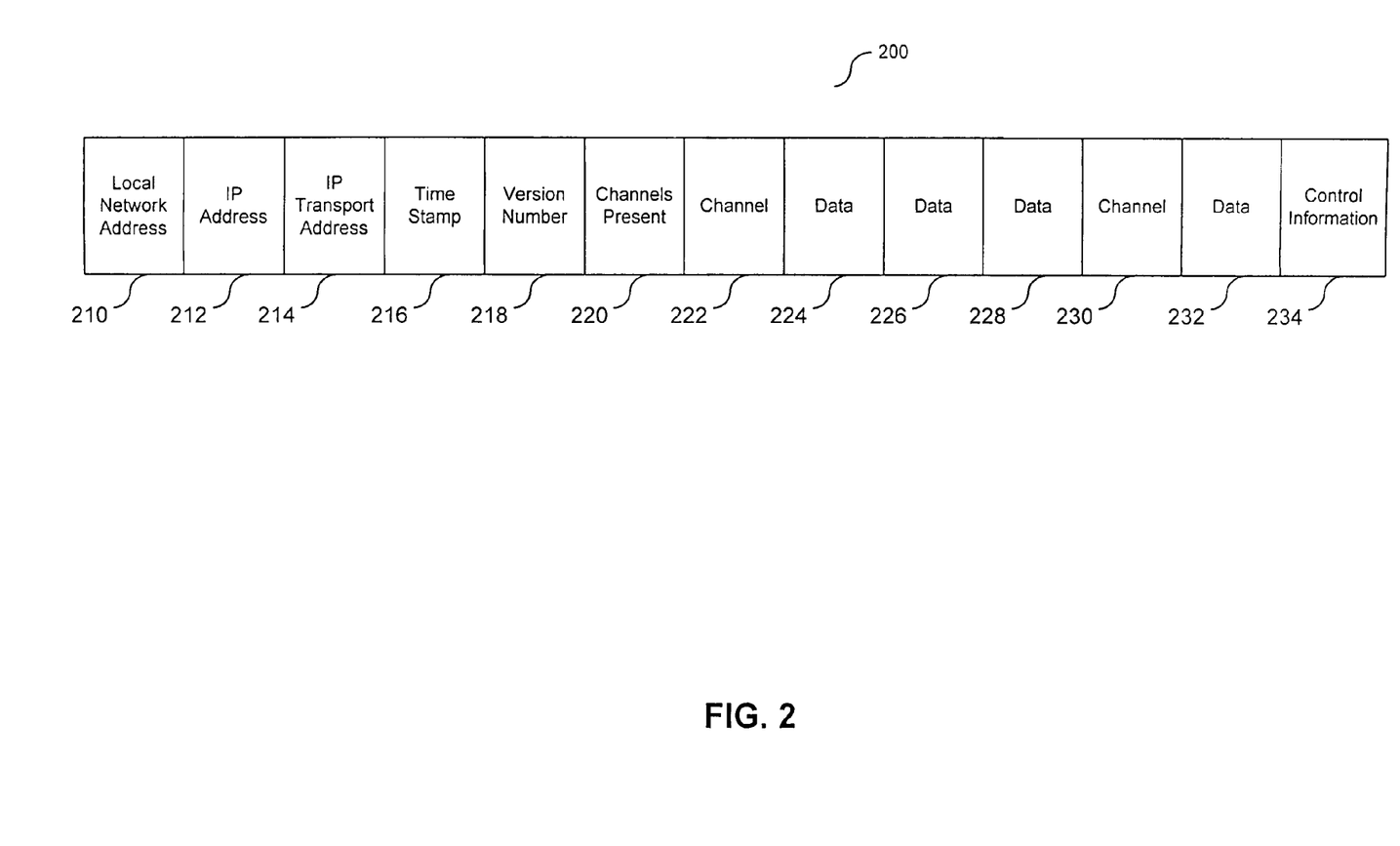
FIG. 2 illustrates an IP datagram used in FIG. 1.

As discussed above with reference to FIG. 1, each port 104a–104x in gateway 102A receives a data stream from its respective channel. The data stream is subsequently digitized, if in analog form, and compressed into packets. The packets are sent to the media framer 108 where the packets are aggregated into multiple frames. As shown in FIG. 2, the headers for the aggregated data packet 200 include a local network address header 210, IP address header 212 and IP transport header 214. In one embodiment of the present invention, the IP transport header 214 represents a UDP address. The IP transport header 214 can also include a Transmission Control Protocol (TCP) address. One embodiment of the present invention also includes a time stamp header 216 which is common to all packets. The time stamp header 216 contains two bytes of data. A version number header 218 is also included. The version number header 218 is one byte in size and identifies which channels are open or on-line at the time of transmission. The version number selects one of the versions in a version table that is currently synchronized between the sender and receiver. When a new version needs to be created, due to a change in the channels that are active, the sender will create a new version table entry, send the new version table entry to the receiver, and wait for an acknowledgment. Once such an acknowledgement is received, it will begin transmission under the new version scheme. For example, Table II shows three possible scenarios where each column contains an ordered list of open channels. Version 1 indicates that only channels 1, 3, 4 and 5 are open. In Version 2, channel 4 has been disconnected but channel 2 is now open.

TABLE II

| Version 1 | Version 2 | Version 3 |
|---|---|---|
| 1 | 1 | 1 |
| 3 | 2 | 2 |
| 4 | 3 | 3 |
| 5 | 5 | — |

Figure 3:
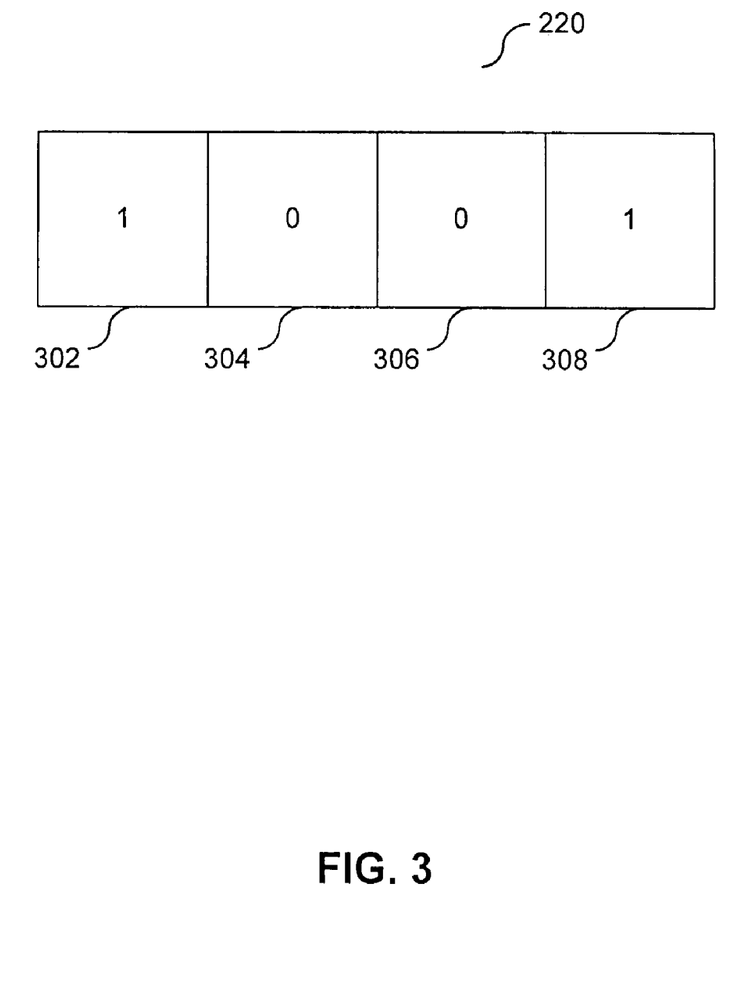
FIG. 3 illustrates a channel present frame of an embodiment of the present invention.

A sixth header is a channels present header 220 that is used to indicate which channels are open and communicating. FIG. 3 shows one possible embodiment of the data in the channels present header 220. Each cell (i.e., cells 302–308) corresponds to the channels in the version number header 218. For example, referring to Table II, if Version 2 is the gateway's current state, the channels present frame would indicate a "1" in cell 302, "0" in cell 304, "0" in cell 306 and "1" in cell 308 to indicate that Channels 1 and 5 are on-line and communicating, and Channels 2 and 3 are on-line but not communicating. The size of the channels present header 220 is one or more bytes, depending on the number of entries in the version number header 218.

Data packet 200 also includes a header (i.e., headers 222 and 230) to indicate which channel is associated with each data frame. For instance, assuming, once again, that Version 2 is the current state, header 222 would identify channel 1 whereas frames 224, 226 and 228 would represent the data associated with channel 1's header 222, and header 230 would identify channel 5 whereas frame 232 would represent the data associated with channel 5's header 230. The size of the channel headers 222 and 230 is one byte each. The final header 234 contains the control information that indicates when a new version is in use (i.e., switching from Version 2 to Version 3). The control information header 234 is seldom transmitted because the data packets can be transmitted as frequently as every 30 milliseconds (ms). It is practically infeasible for a caller to hang-up and disconnect the channel every 30 ms to make it necessary to transmit this information with each data packet.

One embodiment of the present invention uses a time stamp header 216, version number header 218, channels present header 220, channel headers 222 and 230 and control information header 234, as depicted in FIG. 2. In the convention system described above, a single RTP header is used for each channel. For example, if ten channels are routing data, ten RTP headers would be transmitted. However, in the present invention, since a plurality of data frames are being aggregated from multiple calls, there would now be a single channel, with a single header on each data packet that is not in RTP format. As a result, the total header size for the present invention is 40 bytes for the local network address 210, IP address 212 and IP transport (e.g., UDP) 214 headers, four bytes for the time stamp 216, version number 218, channels present 220 and control information 234 headers, and two bytes for the channel header for each active channel. For example, assuming that ten channels are open, the total header size would be 64 bytes. It should be noted that because the control information header 234 would rarely contain data, as explained above, the size of this header is ignored in calculating the total header size.

The size for the aggregated data frames also depends on the number of open channels. On average, each data frame can hold 20 bytes per frame in each packet per channel. As shown in Table III, assuming only 10 channels are open, one data frame per packet would hold 200 bytes.

TABLE III

| #Data Frames per Packet | Latency | Header Size | Data Size | % Overhead | Bandwidth Index |
|---|---|---|---|---|---|
| 1 | 30 ms | 64 bytes | 200 bytes | 24% | 1.32 |
| 2 | 60 ms | 64 bytes | 400 bytes | 14% | 1.16 |
| 3 | 90 ms | 64 bytes | 600 bytes | 9.6% | 1.11 |

Transmission control module 110 defines the format for each data packet and updates and synchronizes the header information attached to the data packets. The data packets are transmitted over an IP network to the destination gateway 102B in the vicinity of the called party. Transmission control module 116 and media framer module 114 in destination gateway 102B deframes and sends the packets 118a–118x to the respective channel ports 120a–120x.

As can be seen in Table III, one significant benefit of the present invention is a substantial reduction in overhead and required bandwidth. Referring to Table I, the conventional IP telephony system requires 4 times the bandwidth to transmit one data frame per packet due to a 75% overhead. According to one embodiment of the present invention, as seen in Table III, the overhead for one data frame per packet is 24% requiring a 1.32 bandwidth index. Furthermore a reduction in latency is also realized by the present invention. For instance, in the conventional system as shown in Table I, data would have to be transmitted every 90 ms or more to reduce the bandwidth index to 2.0. However, as seen in Table III, the bandwidth index is less than 2 at a 30 ms data transmission rate.

B. Data Redundancy

The present invention also reduces dropouts (i.e., missing or lost data packets) that conventional Internet telephony systems cannot replace in a timely manner. One embodiment of the present invention is depicted FIG. 4. Data packets 402, 404 and 406 represent three distinct data packets transmitted sequentially from originating gateway 102A to the destination gateway 102B in Internet telephony system 100 of the present invention. In an embodiment of the present invention, media framer module 108 implements a redundancy routine that periodically transmits a check sequence data packet 408 at regularly scheduled packet intervals. For example, referring to FIG. 4, the check sequence data packet 408 is routed after every third data packet. System 100, however, can be configured to alter the packet interval from 1 to N to reach a desired tradeoff between increased tolerance to loss and bandwidth conservation.

Figure 4:
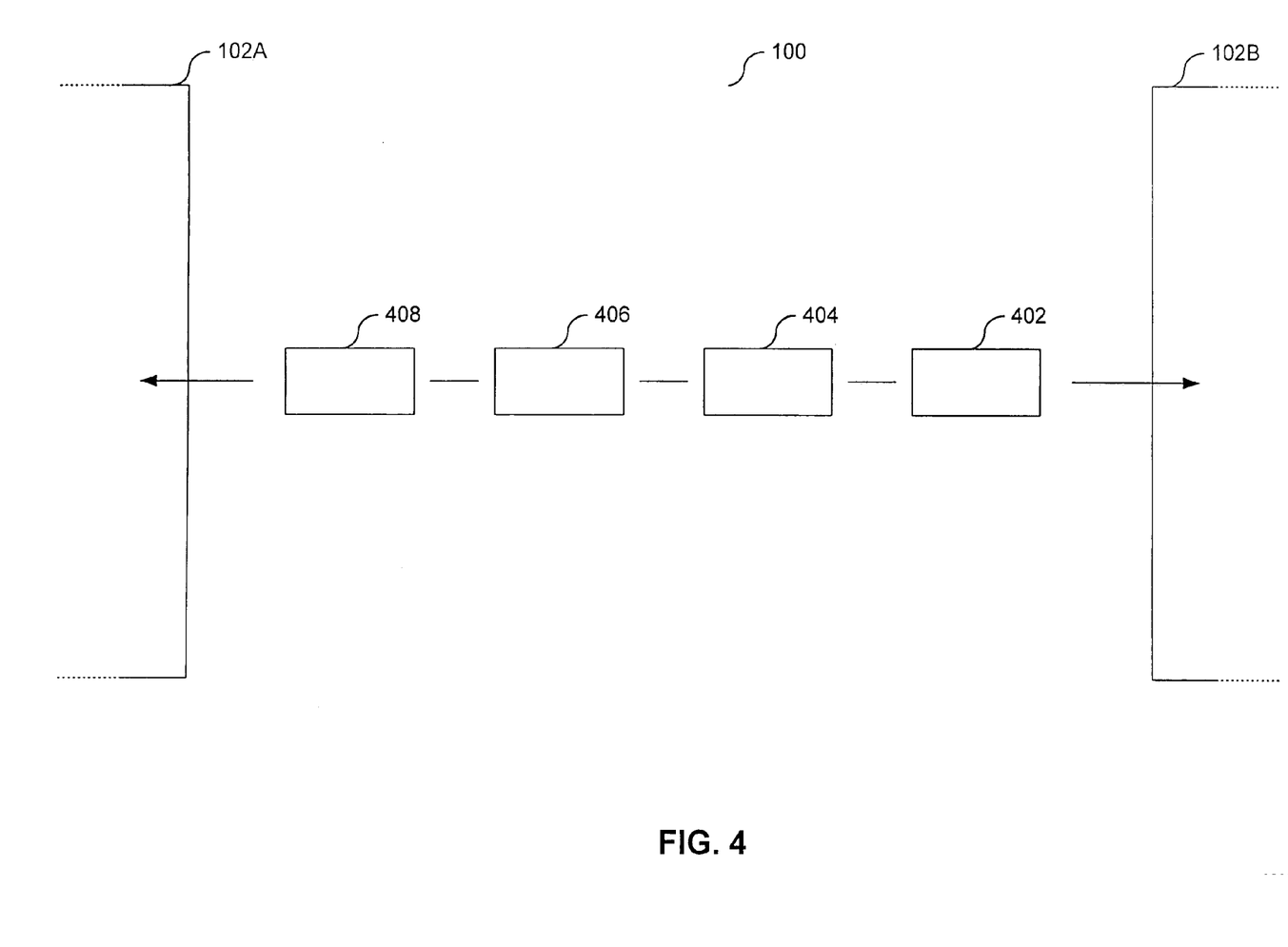
FIG. 4 illustrates a redundancy packet of an embodiment of the present invention.

The check sequence data packet 408 is specially formatted so that if data in any one of the previously transmitted data packets 402, 404 and 406 are missing or damaged, it is possible to completely regenerate the missing or damaged data frame(s) with the information located in the check sequence data packet 408. The check sequence data packet 408 uses a parity system wherein the sum of the bits at a particular index into each frame must be even, with zero padding used on frames of unequal length for the purpose of parity generation. For instance, if one cell is blank and the sum is odd, system 100 would know that the missing cell is a "1"; otherwise the missing cell is a "0".

Adding the check sequence data packet 408 would attribute a 33% increase in overhead over the other data packets when used with a block length of three. In other words, referring to Table III, to transmit one data frame, the system of the present invention would require 1.32 times the bandwidth needed to transmit the data frame. By sending check sequence data packet 408, the required bandwidth would increase by 33% to 1.76 times the required bandwidth. A 1.76 bandwidth index is a significant improvement over the 4.0 bandwidth index needed to transmit one data frame in the conventional system depicted in Table I.

V. Example Implementations

The present invention (i.e., system 100, gateways 102A and 102B, media framer modules 108 and 114, transmission control modules 110 and 116, or any part thereof) can be implemented using hardware, software or a combination thereof and can be implemented in one or more computer systems or other processing systems. In fact, in one embodiment, the invention is directed toward one or more computer systems capable of carrying out the functionality described herein.

Figure 7:
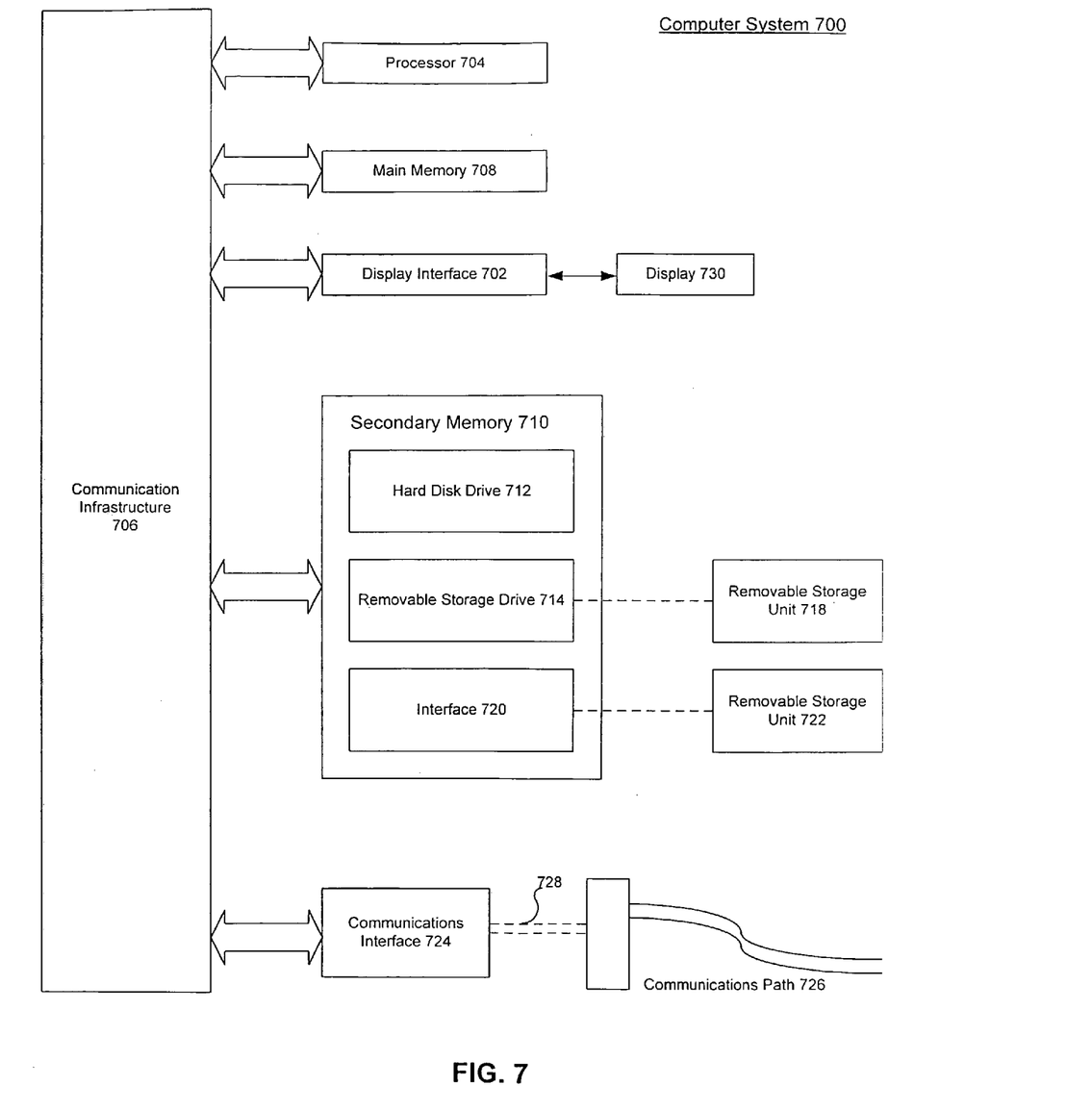
FIG. 7 is a block diagram of an example computer system useful for implementing the present invention.

Referring to FIG. 7, an example computer system 700 useful in implementing the present invention is shown. The computer system 700 includes one or more processors, such as processor 704. The processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 700 can include a display interface 702 that forwards graphics, text, and other data from the communication infrastructure 706 (or from a frame buffer not shown) for display on the display unit 730.

Computer system 700 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to removable storage drive 714. As will be appreciated, the removable storage unit 718 includes a computer usable storage medium having stored therein computer software and/or data.

In alternative embodiments, secondary memory 710 can include other similar means for allowing computer programs or other instructions to be loaded into computer system 700. Such means can include, for example, a removable storage unit 722 and an interface 720. Examples of such can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 can also include a communications interface 724. Communications interface 724 allows software and data to be transferred between computer system 700 and external devices. Examples of communications interface 724 can include a modem, a network interface (such as an Ethernet card), a communications port, a PCM-CIA slot and card, etc. Software and data transferred via communications interface 724 are in the form of signals 728 which can be electronic, electromagnetic, optical or other signals capable of being received by communications interface 724. These signals 728 are provided to communications interface 724 via a communications path (i.e., channel) 726. This channel 726 carries signals 728 and can be implemented using wire or cable, fiber optics, a phone line, a cellular phone link, an RF link and other communications channels.

In this document, the terms "computer program medium" and "computer usable medium" are used to generally refer to media such as removable storage drive 714, a hard disk installed in hard disk drive 712, and signals 728. These computer program products are means for providing software to computer system 700. The invention is directed to such computer program products.

Computer programs (also called computer control logic) are stored in main memory 708 and/or secondary memory 710. Computer programs can also be received via communications interface 724. Such computer programs, when executed, enable the computer system 700 to perform the features of the present invention as discussed herein. In particular, the computer programs, when executed, enable the processor 704 to perform the features of the present invention. Accordingly, such computer programs represent controllers of the computer system 700.

In an embodiment where the invention is implemented using software, the software can be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above described exemplary embodiments, but should be defined only in accordance with the following claims and their equivalents.

What is claimed is:

1. A method for reducing overhead, latency, and/or packet loss for a voice and data over Internet Protocol (VoIP) packet transmitted between an originating gateway and a destination gateway, comprising the steps of:

(1) compressing voice streams and/or data streams from a plurality of concurrent calls from a plurality of channels into packets;

(2) aggregating said packets into a single packet to produce the VoIP packet, said VoIP packet including information, that when executed, synchronizes a current channel state at the originating gateway with a record of said channel state at the destination gateway; and (3) transmitting the VoIP packet between the originating gateway and the destination gateway through a single virtual connection.

2. The method of claim 1, wherein step (2) further comprises the step of providing a plurality of voice frames and/or data frames and a plurality of header frames in the VoIP packet, wherein said plurality of header frames comprises at least one header frame selected from the group consisting of a time stamp header, local network address header, IP address header and UDP header and at least one header frame selected from the group consisting of a version number header and control information header.

3. The method of claim 1, further comprising the step of converting analog voice streams and/or analog data streams to digital voice streams and/or digital data streams prior to executing said compressing step.

4. The method of claim 1, further comprising the step of transmitting a check sequence packet at regular packet intervals, wherein a duration of said intervals is altered to reach a desired tradeoff between increased tolerance to loss and bandwidth, wherein a parity system and information located inside of said check sequence packet is used to regenerate missing or damaged information in a previously transmitted VoIP packet.

5. The method of claim 1, wherein said channel state identifies whether a channel is open or on-line.

6. The method of claim 1, wherein step (2) further comprises the step of providing in the VoIP packet a channel present header for indicating whether a channel is currently open and communicating.

7. The method of claim 1, wherein step (2) further comprises the step of providing information in the VoIP packet to instruct the destination gateway to start using said record to deframe the VoIP packet.

8. The method of claim 1, wherein step (3) further comprises the steps of:

(a) transmitting a plurality of VoIP packets from the originating gateway to the destination gateway; and (b) transmitting a check sequence packet from the originating gateway to the destination gateway upon completion of a transmission of said plurality of VoIP packets, wherein said check sequence packet comprises information that, when executed, regenerates missing or damaged information transmitted in any of said plurality of VoIP packets.

9. A system for reducing overhead, latency, and/or packet loss in a voice and data over Internet Protocol (VoIP) packet transmitted between an originating gateway and a destination gateway, said system comprising:

media framing means for aggregating packets from a plurality of concurrent calls from a plurality of channels into a single packet to produce a VoIP packet;

transmission control means for providing information in the VoIP packet to synchronize a current channel state at the originating gateway with a record of said channel state at the destination gateway;

redundancy means for regenerating missing or damaged information transmitted in the VoIP packet; and a single virtual connecting means for transmitting the VoIP packet from the originating gateway to the destination gateway.

10. The system of claim 9, wherein the VoIP packet comprises a plurality of voice frames and/or data frames and a plurality of header frames, comprising at least one header frame selected from the group consisting of a time stamp header, local network address header, IP address header and UDP header and at least one header frame selected from the group consisting of a version number header and control information header.

11. The system of claim 9, further comprising:

means for transmitting and receiving voice streams and/or data streams;

means for converting analog voice streams and/or analog data streams to digital voice streams and/or digital data streams;

means for compressing digital voice streams and/or digital data streams into said packets; and means for transmitting a check sequence packet after a transmission of a predetermined quantity of VoIP packets, wherein said media framing means produces each VoIP packet of said predetermined quantity of VoIP packets.

12. The system of claim 11, wherein said check sequence packet includes check sequence information that, when executed, regenerates missing or damaged information transmitted in the VoIP packet, wherein said redundancy means produces said check sequence information.

13. The system of claim 9, wherein said single virtual connecting means enables transmission of the VoIP packet from said media framing means at the originating gateway directly to a second media framing means at the destination gateway.

14. The system of claim 9, wherein said single virtual connecting means enables transmission of the VoIP packet from said transmission control means at the originating gateway directly to a second transmission control means at the destination gateway.

15. The system of claim 9, wherein said redundancy means further comprises:

means for transmitting a check sequence packet upon completion of a transmission of a predetermined quantity of VoIP packets; and means for regenerating missing or damaged information in any of said predetermined quantity of VoIP packets.

16. The system of claim 15, wherein said redundancy means further comprises means for implementing a parity system to regenerate missing or damaged information.

17. A computer program product comprising a computer useable medium having computer readable program code means embedded in said medium for causing a computer to reduce overhead, latency, and/or packet loss in a VoIP packet transmitted between an originating gateway and a destination gateway, comprising:

first computer readable program code means for causing the computer to compress voice streams and/or data streams from a plurality of concurrent calls from a plurality of channels into packets;

second computer readable program code means for causing the computer to aggregate said packets into a single packet to produce the VoIP packet;

third computer readable program code means for causing the computer to transmit the VoIP packet between the originating gateway and the destination gateway through a single virtual connection;

fourth computer readable program code means for causing the computer to provide information in the VoIP packet to synchronize a current channel state at the originating gateway with a record of said channel state at the destination gateway; and fifth computer readable program code means for causing the computer to determine if the VoIP packet contains missing or damaged information or to regenerate said missing or damaged information.

18. The computer program product of claim 17, wherein said second computer readable program code means further comprises computer readable program code means for causing the computer to provide a plurality of voice frames and/or data frames and a plurality of header frames in the VoIP packet, wherein said plurality of header frames comprises at least one header frame selected from the group consisting of a time stamp header, local network address header, IP address header and UDP header and at least one header frame selected from the group consisting of a version number header and control information header.

19. The computer program product of claim 17, further comprising sixth computer readable program code means for causing the computer to convert analog voice streams and/or analog data streams to digital voice streams and/or digital data streams prior to executing said first computer readable program code means.

20. The computer program product of claim 17, wherein said fifth computer readable program code means further comprises computer readable program code means for causing the computer to transmit a check sequence packet upon completion of an execution of said third computer readable program code means, wherein said check sequence packet comprises information that, when executed, regenerates said missing or damaged information.

21. The computer program product of claim 17, wherein said fifth computer readable program code means further comprises:
   sixth computer readable program code means for causing the computer to transmit a check sequence packet at regular packet intervals;
   seventh computer readable program code means for causing the computer to alter a duration of said intervals to reach a desired tradeoff between increased tolerance to loss and bandwidth; and
   eighth computer readable program code means for causing the computer to regenerate missing or damaged information in a previously transmitted VoIP packet by using information located inside of said check sequence packet.

22. The computer program product of claim 21, further comprising ninth computer readable program code means for causing the computer to utilize a parity system to regenerate missing or damaged information.

* * * * *